March 31, 1964     N. B. NICHOLS     3,127,105
CONTROLLER IMPROVEMENTS INCLUDING BUMPLESS GAIN
ADJUSTMENT AND PREVENTION OF RESET WINDUP
Filed Sept. 15, 1959

INVENTOR.
Nathaniel B. Nichols
BY P. J. Young, Jr.

3,127,105
CONTROLLER IMPROVEMENTS INCLUDING BUMPLESS GAIN ADJUSTMENT AND PREVENTION OF RESET WINDUP
Nathaniel B. Nichols, Rochester, N.Y., assignor to Taylor Instrument Companies, Rochester, N.Y., a corporation of New York
Filed Sept. 15, 1959, Ser. No. 840,157
18 Claims. (Cl. 236—78)

This invention relates to the art of automatic control, and it is the general object of the invention to provide an electrical controller of novel and inventive design.

A second object of the invention is to provide a controller having non-interacting response adjustments.

A further object of the invention is to provide a proportional plus reset controller wherein the reset response of the controller does not cause undue excursions of the process variable as a result of the controller's attempt to reduce a major deviation of the process variable, as in start-up of a process.

Again, it is an object of the invention to provide a proportional plus reset controller not subject to reset windup or to overpeaking as a result of its reset response.

Yet another object of the invention is to provide a controller having means to limit the control output thereof to a desired range of such output.

It is likewise an object of the invention to provide a controller including amplifying means responsive to an input to said controller to produce a control output, and having means responsive to the control output thereof to suppress the effect of controller input on said amplifying means to the extent that input deviations tend to cause the said output to go out of given bounds.

Still further, it is an object of the invention to provide a controller having a gain adjusting means so contrived that bumpless adjustment of controller gain can be made.

Another object of the invention is to provide a novel switch and capacitor arrangement suitable for use as a gain adjustment device in an electrical controller according to the invention.

These and other objects of the invention will be clearly evident from the description to follow of my invention and from the claims appended hereto.

The art of process control in general involves the regulation of a given process such that the magnitude of a process variable or condition, such as temperature, is maintained, or is attempted to be maintained at some given value, usually termed the control point of such variable or condition. The actual work of regulating the process is performed by a control element, such as a valve, rheostat, or like device, under the control of a so-called controller which, so to speak, examines the state of the process variable being regulated and, by reference to the control point, determines how the control element should apply its control effect to the process.

In the more elaborate types of control installations, the controller may cause the control element to exert its control effect in accordance with the magnitude of the deviation of the process variable from the control point, the rate of change of deviation, and the duration of deviation, the sense of the composite control effect induced in accordance with these factors opposing the said deviation. These factors, in the order named supra, are generally discussed in terms of (1) the proportional gain, proportional band, or sensitivity response of the controller; (2) the rate, deviation, or pre-act response of the controller; and (3) the reset, reset rate, or integral response of the controller, or for short, gain, rate and reset, in that order.

One of the common problems of controller design is to provide for adjusting one or another of the various controller responses without affecting the state of adjustment of its fellows. Heretofore, such expedients as multiple stages and isolating relays have been successfully used for the general purpose of providing a controller arrangement wherein the total controller response is more or less given by the sum of its individual gain, rate and/or reset settings, each considered apart from the others, but at the cost of increased structural complexity of the controller. In contrast, my novel controller permits of non-interacting adjustment of gain, rate and reset, without resorting to use of multiple stages or isolating relays.

More specifically, my novel controller requires but one high gain relay or amplifier and, by virtue of passive impedance networks at the input of and in a feedback loop around the relay, produces a full complement of control responses each of which is adjustable without affecting the state of adjustment of the others.

In addition, the proportioning and integrating actions of a controller inherently interact during control, since, with reset action, a deviation of the process variable causes the proportional band to be shifted in a sense opposite to that of the deviation by an amount equal to the magnitude of the deviation, whether the deviation is within the proportional band of the controller or not. Furthermore, as long as any deviation lasts, the reset action continues to shift the proportional band until one or the other limit of the controller's output is reached. As a result, when the deviation decreases as a result of the control effect caused by the effect of the controller output on the control element, the controller must wait until the reset effect disappears before it can begin to cause the control element to change the sense of the control effect. Such change, however, does not occur until the control point is reached by the process. As a result, the controller, in its attempt to reduce the initial deviation, causes another deviation in the opposite sense.

The same results are reached in using a prior art proportional plus reset controller in starting up a process, or on a process where deviations may on occasion be large enough to go outside the proportional band determined by the gain setting of the controller.

The addition of rate action to the proportional plus reset controller is sometimes used to prevent or mitigate overpeaking of the process variable under the conditions described above. While it is generally held that rate, as a rule, never "hurts" control of any type of process, nevertheless, control situations are not uncommon where rate is of little benefit for its own sake and the additional expense and complexity of rate is not desirable.

While rate action can in some cases mitigate or even eliminate overpeaking due to the peculiarities of reset, it does not attack the difficulty directly by controlling the reset action itself in the controller, but is rather dependent for its benefits in being applied to the right type of process situation.

According to my invention, however, the undesirable effects of reset are prevented without need of using rate action by providing means responsive, in effect, to controller output to condition the reset action of the controller so that proportional action begins before the process variable achieves the control point, specifically, by one reset time, i.e., the reciprocal of the "reset rate" or repeats per minutes, as reset settings are often expressed. Thus, independently of the process (once a reset setting has been chosen) my novel controller begins proportional action a predetermined interval of time before the process variable crosses the control point, whereby overpeaking due to "reset wind up" is substantially prevented.

Turning from the foregoing generalities to a specific embodiment of my invention, in the drawings.

Figure 1:
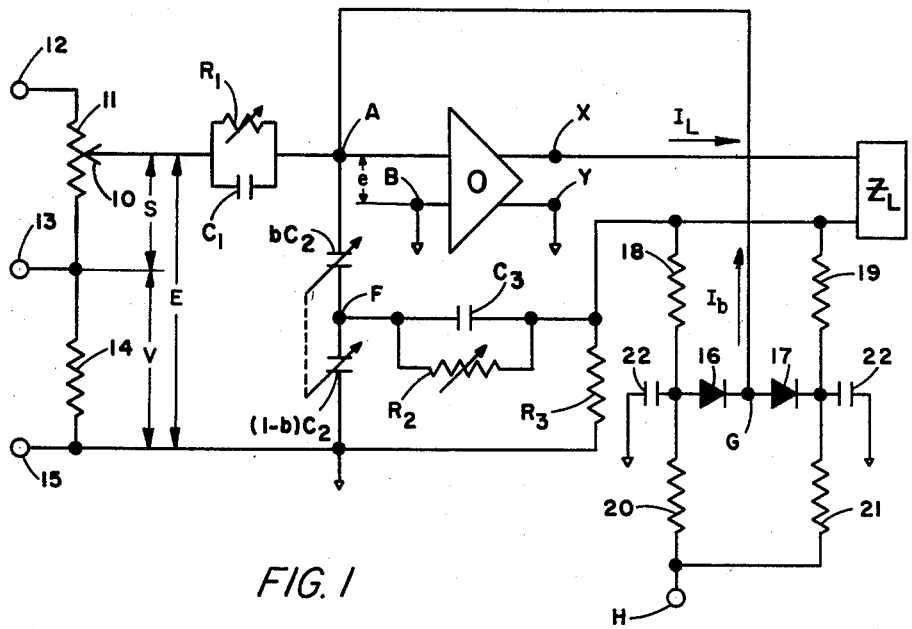
FIGURE 1 illustrates schematically an electrical form of a controller according to the invention.

The controller of FIGURE 1 is essentially a voltage amplifier which by virtue of suitable feedback and input circuitry produces an output voltage which bears some prescribed functional relation to an input voltage, applied to the amplifier to produce said output voltage. In this case, there is provided a high gain, low drift electrical voltage amplifier O capable of amplifying both zero frequency and variable voltages of the sort encountered in process control. The amplifier O is the inverted type, i.e., change of input voltage in one direction or sense causes the output voltage to change in the opposite direction or sense. In a typical case, a voltage $e$ at the input of the amplifier O, varying from $-12$ millivolts to $+12$ millivolts, would cause the output voltage of the amplifier O to vary from, say $+50$ volts to $+10$ volts, the amplifier O being set to deliver 30 volts when voltage $e$ is zero.

The voltage $e$ is applied across a pair of input terminals A and B and the output voltage appears across a pair of output terminals X and Y. In FIG. 1, inverted triangles, e.g., those shown connected to B and Y, indicate circuit common, a point of reference potential to which voltage $e$ at terminal A and various other circuit voltages are referred, as indicated in FIG. 1.

The voltage $e$ at terminal A is in part determined by a network consisting of a resistor $R_1$ and a capacitor $C_1$, connected in parallel between terminal A and a movable tap 10 on a variable resistor 11, one end of resistor 11 being connected to a terminal 12 and the other end thereof to a terminal 13. In addition, a resistor 14 is connected at one end to terminal 13 and at its other end to a terminal 15, which in turn is shown to be connected to circuit common.

A voltage E, which is the summation of a process variable voltage V across terminals 13 and 15 and a set point voltage S across terminal 13 and tap 10, appears at tap 10.

For process control purposes, voltage V would be obtained from some device measuring a process variable such as temperature and producing a voltage across terminals 13 and 15 proportional in magnitude to the magnitude of the process variable. Voltage S, on the other hand, would be obtained by applying a fixed voltage across terminals 12 and 13, whereby tap 10 is capable of being set to produce a voltage proportional in magnitude to that value of the process variable that is desired to be maintained. Voltages V and S would be applied to the terminals so that the resultant voltage E would be equal to the difference in absolute magnitude of voltages V and S, and have the sign of the voltage of greater absolute magnitude. Voltages E and $e$ may be thought of as primary and secondary error voltages, respectively, since the former is an error voltage relative to the control system as a whole, whereas the latter is an error voltage relative to a part of the control system, namely, amplifier O.

The useful load on the controller output is represented by an impedance $Z_L$, which for the present purpose may be thought of as a fixed resistance, the current through which corresponds to a control effect in a process under control, said control effect being such as to keep or tend to keep primary error voltage E at zero. One end of load $Z_L$ is connected to circuit common via a feedback resistor $R_3$ forming part of a feedback network, which in conjunction with $R_1$, $C_1$ and amplifier O, determine the relationship of second error voltage $e$ to a given primary error voltage E. Said network also includes a network consisting of a resistor $R_2$ and capacitor $C_3$ connected in parallel, and capacitor $(1-b)C_2$. Capacitor $(1-b)C_2$ is connected at one side to circuit common, and the network consisting of $R_2$ and $C_3$ in parallel is connected at one end between $Z_L$ and $R_3$, and at its other end to the other side of $(1-b)C_2$. In addition capacitor $bC_2$ is connected between terminal A and the said other side of $(1-b)C_2$.

The basic assumption in describing the functioning of a controller of the type described is that the secondary error voltage $e$ be substantially zero. Hence, amplifier O is chosen to have a without-feedback voltage gain of many hundreds or more (ideally it should be infinite), and to have an input impedance that is high compared to $R_1$; and both amplifier and circuit constants in general are chosen so that only a very small swing in voltage $e$ is necessary to produce a given swing of load current through $Z_L$.

Accordingly, secondary error voltage $e$ may be considered zero so that the sum of the currents flowing to and/or from terminal A may also be taken as zero for the purpose of determining the relation between primary error voltage E and the voltage at the junction of $Z_L$ and $R_3$, whereby it results that $$\frac{E_0}{E} = \frac{Z_0}{Z_i} \qquad (1)$$

where $E_0$ = voltage at the connection between $Z_L$ and $R_3$, referred to circuit common; $E$ = voltage at tap 10 referred to circuit common, $Z_0$ = impedance of the feedback network between terminal A and the connection of $Z_L$ and $R_3$, and; $Z_i$ = impedance of the input network between terminal A and tap 10.

By application of Kirchoff's laws, the right-hand member of Equation (1), can be expressed in terms of circuit constants arranged in transfer function form, whereby it results that $$-\frac{E_0}{E} = \frac{C_1}{bC_2}\left(1 + \frac{1}{R_1C_1P}\right)\left(\frac{R_2(C_2+C_3)P+1}{R_2C_3P+1}\right) \qquad (2)$$

where P is the Laplace operator, the other symbols being as defined before, and R and C values being taken as ohms and farads, respectively.

Those skilled in the art will see that Equation (2) indicates that it is possible to adjust each major control response of the controller independently of others. The responses in question are gain, reset, and rate, the expressions for which are, respectively, and by inspection of Equation (2):

$$\frac{C_1}{bC_2}; \frac{1}{R_1C_1}; \text{ and } A_2(C_2+C_3)$$

Hence, in accordance with the invention, I have illustrated $R_1$ and $R_2$ as variable resistors and have provided $C_2$ on the form of variable capacitances $bC_2$ and $(1-b)C_2$, ganged for simultaneous adjustment and so arranged that, when adjusted, if $b$ equal a number between zero and one, the sum of $(1-b)C_2$ and $bC_2$ is always equal to $C_2$.

Insofar as I am aware, the form of response circuitry leading to Equation (2) is novel and I consider it an important feature of the invention because of certain properties thereof including that of having noninteracting response adjustments.

Since non-interaction between gain and rate time adjustments requires that the capacitance $C_2$ of Equation (2), which is a composite capacitance, be constant, I provide $C_2$ in the form of two banks of capacitors where adjustment of gain is made by switching capacitors from one bank to the other, whereby the total capacitance of the banks, i.e., $C_2$, remains fixed while on the other hand, the two banks form a voltage divider for the feedback voltage applied to a terminal F, the connection between the two bank-capacitances $bC_2$ and $(1-b)C_2$. The resulting capacitance switching arrangement has the virtue of being operable at any time without "bumping" the controlled process, i.e., no transients will occur due to switching that are of such nature as to cause the output of the controller to change the valve position or other control effect in a way that would disturb the process. This is because, whether E, the primary error voltage, be zero or not, each bank capacitor is charged to substantially the same value of feedback voltage as its fellows at all times and terminal A does not differ enough in potential from circuit common to matter, insofar as switching is concerned. Therefore, addition or subtraction of a capacitor from $bC_2$ will not change the potential of terminal A.

Figure 2:
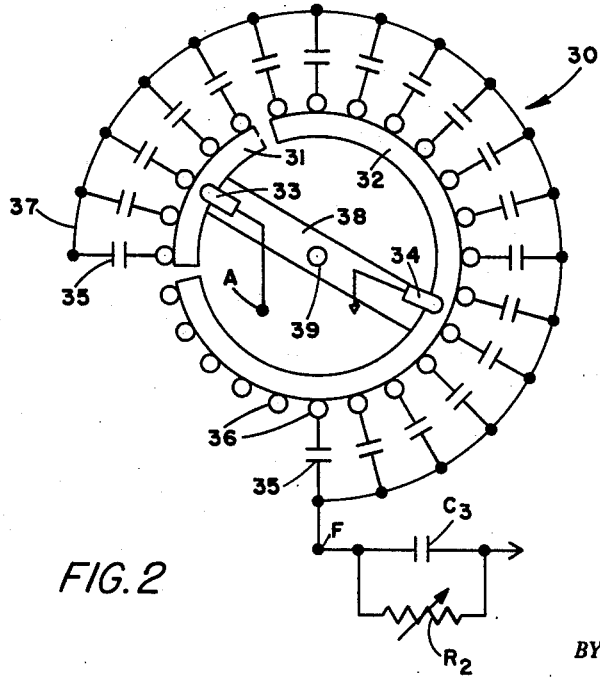
FIGURE 2 illustrates in more detail a gain adjusting feature shown in FIGURE 1.

In FIGURE 2, the reference numeral 30 indicates generally the switch and capacitor arrangement making up the proportional gain control device defined by $bC_2$ and $(1-b)C_2$. The switch element of gain control 30 includes a pair of conducting segments 31 and 32, segments 31 and 32 having brushes, flexible conductors, or equivalent pick-off elements 33 and 34 serving to maintain segment 31 connected to terminal A of amplifier O and segment 32 connected to circuit common, as the segments are moved to pick up and drop contact with various of a plurality of capacitors 35 each having one side connected to one of a plurality of stationary contacts 36. For convenience, the switch, as suggested by FIGURE 2, can be of the rotary type, hence segments 31 and 32 could be mounted on a bar 38, or the like, of insulating material, mounted on a pivot 39, so that by turning a knob or the like (not shown), it is possible to select any five consecutive contacts by segment 31, or any 19 consecutive contacts by segment 32.

Each of capacitors 35 has its remaining side connected to a common bus 37 and this is in turn connected to the connection F of $bC_2$, $(1-b)C_2$ and $R_2$ and $C_3$ in parallel, FIGURE 1.

The length of segments 31 and 32, and the contact spacing are such that the leading end of each segment, as the segments are turned, does not contact the contact 36 that the trailing end of its fellow segment is leaving, until electrical contact between said contact and the latter segment is broken. Pick-off element 33 and segment 31, of course, remain electrically isolated from pick-off element 34 and segment 32 at all times. In the configuration shown in FIGURE 2, it is obvious that extreme counterclockwise condenser electrically connected to segment 31 could be dropped out of circuit and the total capacitance between terminal A and bus 37 changed by an amount equal to the difference between the capacitance of said condenser and the value of that condenser electrically connected to and located furthest counterclockwise of segment 32. At the same time, the first said condenser will be picked up by segment 32, whereby it results that the sum total of the capacitors in the banks defined by the positions of segments 31 and 32, and therefore $C_2$, remain the same irrespective of how the capacitance is distributed between the banks. It is also obvious that every capacitor is at all times being charged by the voltage at connection F.

In FIGURE 2, if the segments are considered as being shown in their extreme counterclockwise position, and if each capacitor, beginning with the extreme counterclockwise capacitor connected to segment 31, is larger than its nearest clockwise neighbor, $bC_2$ will be at a maximum and, therefore according to Equation (2), the proportional gain of the controller will be at a minimum. As the segments as shifted clockwise, segment 31 will pick up less capacitance from segment 32 than it releases to segment 32, and, therefore gain increases as a result of clockwise adjustment of said segments. As will be obvious, the total range of capacitance adjustments and the size of the adjustment steps depends on the total capacitance connected to contacts 35, the distribution of such capacitance among the contacts, and the distribution of contacts between segments 31 and 32. In one actual case, it was found possible to proportion condensers arranged as in FIG. 2 so that as the segments were advanced contact by contact clockwise, $bC_2$ and $(1-b)C_2$, decreasing, remained related to each other as the square root of two.

Considerable design variation is possible. For example, although each capacitor 35 is shown as a single unit, in many cases it may be necessary to make one or more capacitor 35 from several units in order to get a value of capacitance not available in a single unit, or to correct a deviation of the value of an individual capacitor from its nominal value. Likewise, notwithstanding the showing of FIG. 2, more or fewer of the contacts 36 may be utilized, nor need the segments bridge all the capacitors or contacts between them in every case.

Those familiar with the operational amplifier art, as represented by the text "Electronic Analog Computers," by Korn and Korn, McGraw-Hill Book Co., Inc., second edition, 1956, will be aware that my inventive control circuit is, in effect, an adaptation of a computing circuit such as shown in Table 1, page 415 of Korn and Korn, namely that circuit that is third from the top in the right-hand column of said Table 1 and has the transfer function numbered 1.8 on page 415.

While it may be hazarded by one skilled in the art that a computing circuit of the Korn and Korn type might in theory form the basis of a process controller, as a practical matter it is not evident how the aforementioned circuit in Table 1 of Korn and Korn could be adapted for controlling.

For example, if one manipulates properly transfer function 1.8 of Korn and Korn, page 415, it can be made to assume a form similar to my Equation (2) (as might be expected since both expressions are derived from the principles of my Equation (1) on the basis of similar operating assumptions). An inspection of the results would indicate, however, that response adjustments, almost without exception mandatory attributes of a controller, would interact strongly, a very undesirable characteristic in a controller. Hence without my concept of $bC_2$ and $(1-b)C_2$, the circuit of Korn and Korn does not recommend itself for use as a controller. Nothing in Korn and Korn suggest such concept and I therefore believe it to represent an unobvious advance in the art that is worthy of the protection of U.S. Letters Patent.

The over-all virtues of the circuit of FIGURE 1, as thus far described, should be apparent. For one thing, the circuitry is quite simple, involving only a few passive response networks for rate and reset, and an amplifier of the D.C. type having high gain, low grid current and high impedance at the input grid, the art of design of such amplifiers being well understood. In fact, the controller, as shown, could be assembled off the shelf, so to speak, since suitable components, including the amplifier O, are readily available, or at least could easily be made readily available, through normal commercial channels.

Again, as noted before, each response is adjustable without affecting the actions of the other responses. Wide variation in controller characteristics can be obtained by using different values of the capacitances $C_1$, $C_2$ and $C_3$, although these, due to their interaction (see Equation 2), would not normally be offered as response adjustments for routine use in service, but would rather be used as a design parameter by the controller manufacturer to provide various ranges of adjustment within the much larger response ranges afforded by choice of the mentioned capacitances.

While I believe that great utility and inventive novelty characterizes my controller, as thus far described, it nevertheless resembles prior art controllers in respect of its reset characteristics. Suppose, for example, that the load $Z_L$ represents a valve positioner, or the like, and the voltage E is at zero, and the current in $Z_L$ is at some mean value corresponding to, say, a 50 percent opening of a process control valve operated by said positioner. In other words, the controller is controlling a process wherein the process variable is at the control point with the process valve holding said variable at the control point by virtue of its state of 50 percent open.

If some disturbance occurs in the process, such as to cause the process variable to deviate from the control point, an error voltage E different from zero will appear at tap 10. Now $R_1$ would be on the order of hundreds of thousands of ohms or more and, therefore, a small voltage $e$, i.e., small compared to E and proportional to the magnitude of E, would appear at terminal A. The amplifier O would respond accordingly and cause the valve position to begin to change in a manner essentially determined by $R_1$, $C_1$, $bC_2$ and $R_2$.

To understood the working of the circuit, consider $C_1$, $(1-b)C_2$ and $C_3$ to be of zero capacitance and infinite impedance and $R_2$ to be zero, and the gain of amplifier O to be infinite. Under these conditions, the circuit of FIG. 1 would be an integrator, or in controller terms, a so-called floating controller. That is, if a step-change in E occurred, creating a current in $R_1$, current would begin to flow between $bC_2$ and terminal A, and the amplifier O would attempt to produce its full output. The output, however, is fed back to $bC_2$ whereby to create a current opposing the change in voltage $e$ at terminal A. Therefore, voltage $e$ would remain small although the amplifier output would increase indefinitely as long as the voltage E remained at the value to which it was stepped. In short, the controller integrates the error signal E.

Next, consider the same case but with $C_1$ at some value other than zero, $R_1$ infinite, and a ramp change in primary error voltage E. Amplifier O would again change its output, but this time in proportion to the rate of increase in E, the actual proportion being determined by the ratio of $C_1$ to $bC_2$. If now, $R_2$ is made a rather high value other than zero, the amplifier O must work hard to force a current through $R_2$, and since it is though of as having infinite gain its proportional output initially rises in step fashion before feedback via $bC_2$ can reduce secondary error voltage $e$ to a nearly-zero level.

If the foregoing phenomena are superimposed, as it were, by restoring $R_1$, $C_1$, and $bC_2$ and $R_2$ to normal values, it appears that shunting of $R_1$, by $C_1$ results in adding proportioning action to reset action by what amounts to adding a differentiation to the simple integrator action of the circuit. Adding $R_2$ to this invokes the rate effect, and adding to the refinement $(1-b)C_2$ results in the possibility of noninteracting adjustment of the various control effects or actions. The function of $C_3$ is to prevent rate action from taking place in response to fluctuations in E at frequencies higher than is desired, hence where no rate action at all is desired both $R_2$ and $C_3$ would be replaced by a short circuit.

From the foregoing, it is easy to see the difficulties involved in the use of reset in process control, since in process control the reset or integrating action of the controller is controlled by the process, i.e., primary error voltage E does not become zero until the controller can reduce the process variable deviation from the control point to zero. However, the integrating action of the controller, in prior art controllers and in the basic controller of FIG. 1, persists until the moment said deviation is reduced to zero. Practical controllers do not have infinite gain and unlimited output, and practical control elements could not benefit by use of controllers thus equipped. This is because practical controllers and control elements lock-up at extremes of output and control effect, if integrating action persists long enough, or on deviations of the process variable outside of the proportional band, so that by the time they leave the said extremes, it is too late so to speak, to begin proportioning action since as proportioning action begins, the process variable, having returned to the control point, is at that time overshooting it in a new deviation in the opposite direction.

It is evident that in both theory and practice, reset action of the controller of FIG. 1, as thus far described, is attended with a fundamental disadvantage. Furthermore, in practice, the operation of the controller in FIG. 1 may suffer from the facts the amplifier O is a device that has a finite gain so that voltage $e$ can become quite large. Swinging of voltage $e$ outside a "nearly-zero" range will cause controller performance to deviate appreciably from that predicted by Equation (2), may cause saturation of the amplifier O, and may create inconveniently large, not to say dangerous voltages at various terminals in the external connections of the controller.

I have solved all such problems by providing the as yet not described limiter circuit shown in FIG. 1. Briefly, the function of the diode circuit is to limit the output of the amplifier, by limiting the secondary error voltage $e$ to values corresponding approximately to the desired limits of amplifier output.

The limiter circuit comprises diodes 16 and 17, connected in series, back to front, at G, the back of diode 16 being connected by a resistor 18 to the connection between $Z_L$ and $R_3$, whereas the front of diode 17 is connected to the same connection through a resistor 19. To bias the diodes, a D.C. voltage H is connected through a resistor 20 to the back of diode 16 and through a resistor 21 to the front of diode 17. If necessary, a pair of capacitors 22 may be provided, as shown, to by-pass stray A.C. away from the diodes to circuit common. The diodes should have as little leakage current as possible.

Since due to the inverted amplifier O, the controller is reverse acting, the maximum error signal E produces a minimum output current in $Z_L$. For example, in a specific case it may be desired that a secondary error voltage $e$ of $-12$ millivolts produces a current of 5 milliamperes through $Z_L$ and $+12$ mv. produce a current of 1 ma. through $Z_L$, whereas if $e=0$, amplifier O is designed to produce 3 ma. through $Z_L$.

To hold the load current in a range of about $(1-5)$ ma., potential H is chosen to be negative, and resistances 18 and 20 are chosen that at about 5.5 ma. through $Z_L$ the back of diode 16 is at zero potential referred to circuit common. Therefore, in a typical case, at about $e=-15$ mv., diode 16 conducts and holds secondary error voltage $e$ at that value by virtue of the feedback through diode 16 to terminal A, diode 17 remaining substantially non-conducting all this time.

On the other hand, should the current through $Z_L$ drop below about 0.5 ma., the values of resistors 19 and 21 are such that the front of diode 17 goes to zero potential relative to the potential of terminal A, whereby the diode 17 conducts and holds the potential of terminal A at a voltage $e$ somewhat greater than 12 mv., diode 16 now being in a non-conducting state.

Preferably $R_1$ should be substantially larger than either diode bias resistors 18 and 20 in parallel or 19 and 21 in parallel for best operation of the limiting circuit. Moreover, prevention of the aforedescribed ill effect of reset action, is as a rule of thumb, best obtained by setting the reset response of the controller a little higher than it would be set for normal process behavior, e.g., process variable deviations of relatively short duration that remain within the proportional band of the controller. In a specific case of the disclosed controller this amounts to increasing $R_1$ by one-half approximately over the resistance for normal reset setting, $R_1$ being a bank of resistors successively and accumulatively switched into circuit between terminal A and tap 10 to give $R_1$ values ranging from about ½ megohm to 400 megohms. Since either or both of the paralleled diode bias resistances may be less than one megohm, it is obvious that for short reset times, $R_1$ cannot be substantially larger always than each paralleled diode bias resistance. However, it is at the longer reset times that reset is at its worst in causing process variable overpeaking, whereas at relatively short reset times overpeaking is usually considered much less serious.

To state it briefly, a given value of primary error signal E is required to just initiate limiting at one or the other of the load current limits. However, for deviations of voltage E from zero greater than said given value, there is also a value at which the limiting action breaks down. The extent of the range of limiting thus defined is inversely proportional, in effect, to the resistance of resistors 18 and 20 in parallel, or of 19 and 21 in parallel (depending on at which end of the load range the range of limiting action is being determined), divided by $R_1$.

If desired, dependence of limiting action on relative values of $R_1$ and the diode bias resistors can be obviated by inserting 1:1 direct amplifiers at the front of diode 16 and the back of diode 17. A 1:1 direct amplifier is an amplifier having a fixed gain of +1, in other words it reproduces at its output a signal equal in sense and magnitude to a signal applied to its input, whereby the sources of such signals are isolated from each other.

It is easy to see that limiting the amplifier input would have certain salutary effects as, for example, preventing saturation of amplifier O.

However, if the circuit of FIGURE 1 be examined more closely, it will be found that, if the output current is being limited by the diode action, if secondary error voltage $e$ decreases, or increases, as the case may be, enough to cut off the conducting diode and the process variable proceeds to the control point, i.e., voltage E goes to substantially zero, then, at about that time the current from the limiter circuit and from $bC_2$ to terminal A will be substantially zero, and the discharge current of capacitor $C_1$ will equal the current through $R_1$, i.e.:

$$I_{R_1} = \frac{E}{R_1} = I_{C_1} = C_1 \frac{dE}{dt}$$

$$\frac{E}{R_1 C_1} = \frac{dE}{dt} \tag{3}$$

which signifies that the secondary error voltage $e$ becomes zero before the process variable reaches the set point by a time equal to $R_1 C_1$, where $R_1$ is taken in ohms and $C_1$ in farads.

In short, the diode limiter circuit of FIGURE 1, compensates for the ill-effects of reset, a function that is not to be expected as a result of limiting amplifier output. This I regard as a most important feature of my invention, since it means that a proportional plus reset controller can be used to control a process from start-up to shutdown, through major process disturbances as well as minor ones, without fear of overpeaking, without resorting to rate action for alleviation of the idiosyncracies of reset and without resort to so-called manual control in order to get the process over hurdles such as start-up, major load changes, etc., in order to avoid the overpeaking that reset would normally be expected to cause.

As a further distinction between FIG. 1 as a controller, and its operational amplifier counterpart, it will be noted that both my Equation (2) and transfer function 1.8 of Korn and Korn relate to voltage-amplifying operation, whereas my controller in fact is used to put out a control current, not a control voltage, so that it may be conceived of as basically a current amplifier.

More strictly speaking and as disclosed thus far, my controller is a voltage to current converter. In practice, however, problems of load matching and transmission are avoided by overall current operation. For example, voltage V is proportional to the current through resistor 14, and hence the process variable would be measured by a measuring device producing an output current proportional to the magnitude of the process variable and in series with resistor 14. Such an arrangement substantially obviates the effects of both transmission line voltage drop and leakage current on the accuracy with which voltage V represents the process variable. Nevertheless, from the point of view of the controller itself, it is immaterial whether it be used as voltage-output device, or a current-output device.

Similar considerations hold as to the utilization of controller output. In addition, current output allows linear operation of popular types of control elements the input to which is converted to force by a coil of impedance $Z_L$ through which passes the control current and wherein such force is then converted by pneumatic or other means into motion of a process control valve stem, or the like.

Under voltage operation, broadly speaking, the load $Z_L$ would be connected across terminals X and Y, and the feedback voltage would be taken from terminal X, i.e., no $R_3$ would be needed if $Z_L$ matched the output impedance of amplifier O satisfactorily.

While voltage operation of $Z_L$ is feasible, it is found that, in practice, current operation is much more advantageous, since the current through $Z_L$ is independent of the resistance of $Z_L$ within wide limits. Therefore, the controller can operate a wide variety of control element loads, subject only to the restriction that $Z_L$ be mainly resistive, and that it be not so large as to exceed the capabilities of the amplifier O for driving the required current through the load.

Irrespective of the pros and cons as to current vs. voltage operation, it nevertheless remains a useful fact that either type of operation can be used, the load $Z_L$ permitting, without changing the characteristic mode of functioning of the controller of FIGURE 1.

To see this, Equation (1) is applied to the circuit of FIG. 1, taking into account the fact that there is a slight leakage current through diodes 16 and 17, even when both are normally in a "non-conducting" state. It then results that the relation between output current and error voltage E is found to be $$-\frac{(I_0 - I_b) R_3}{E} = \frac{C_1}{bC_2}\left(1 + \frac{1}{R_1 C_1 P}\right)$$
$$\left(\frac{R_2(C_2 + C_3)P + 1}{R_2 C_3 P + 1}\right)\left(\frac{1}{1 + R_2 C_2 P\left[\frac{R_2 C_3 P + 1}{R_2(C_2 + C_3)P + 1}\right]}\right) \tag{4}$$

where
$I_0$ = load current;
$I_b$ = current through diodes 16 and 17; and the remaining symbols have the same significance as before.

The term on the extreme right of the right hand member of Equation (4), by which it differs from the right hand member of Equation (2) is a correction of the rate term of Equation (2). In practice, values such as 6,000 ohms and 9.7 microfarads for $R_3$ and $C_2$, respectively, allow considering the rate-correction term equal to unity, hence the numerical correction represented by the said term is negligible. The main significance of the said term is that the time-lag in seconds of the output current relative to the input voltage corresponding to said current is given by the product of $R_3$ in ohms and $C_2$ in farads.

Considering the left hand member of Equation (4), diodes 16 and 17 normally allow only a small leakage current of a few microamperes to flow to or from terminal A. Therefore, for purposes of determining the character of normal controller operation, over a range of (1—5) ma. of load current, say, diodes 16 and 17 do not exist and hence $I_b$ may be considered zero in Equation (4).

It may be said as a practical matter that with $R_3$ small compared to $R_2$ and when the other assumptions involved in using the basic relationship expressed in Equation (2) are justified, that the right hand member of Equation (2) expresses the input-output relation of my novel controller both when the input is conceived as the primary error voltage E at tap 10 and when the output is considered either as the current through $Z_L$ or as the voltage at the junction of $Z_L$ and $R_3$. Under this view, the product $R_3 C_2$ becomes merely a design constant expressing the minimum rate effect in the controller output, obtained either by setting $R_2$ to zero or by replacing $R_2$ and $C_3$ in parallel by a short circuit.

Under voltage operation, the limiter circuit would have to be connected to the terminal X or equivalent location, and its operation would be conceived relative to the voltage across the load, or across terminals X and Y, rather than relative to current through the load. As with the remainder of the controller, the essential mode of operation and its purposes would remain unchanged.

It should be noted that primary error voltage E is, in effect, the only source of secondary error voltage $e$. When voltage E is zero however, voltage $e$ is not necessarily exactly zero, since it may happen that a particular actual example of the circuit of FIG. 1, with $E=0$ and constant in and load current=3.00 ma. and constant out, that $e$ is not exactly zero and may vary slightly from time to time. However, the operation of the controller is not affected thereby. Likewise, it will be noted that some overranging of output current is allowed by the numerical values used for example in explaining limiting before one of diodes 16 and 17 conducts.

While a complete controller according to my invention would conform closely to FIGURES 1 and 2, it is possible to utilize certain features thereof independently of the others. Most notably, the rate action ($C_3$ and $R_2$ in parallel) need not be included. Again, the gain changing feature has utility independently of rate and reset action, and of limiting. For example, it is possible to conceive of a proportional controller wherein though only $bC_2$ is involved, the bumpless switching action would be useful. In such case, $C_2$ as a whole is not involved explicitly and hence need not remain fixed in value. In fact it is easy to imagine impedance arrangements other and more complex than $(1-bC_2)$, wherein the result of switching impedance therefrom into $bC_2$ would still be bumpless. For example, in FIGURE 2, suppose one or another of capacitors 35 to be connected to bus 37 by a resistor. Under such circumstances if the feedback voltage took on a fixed value for a while, the bus side of all capacitors would be substantially at circuit common, and any capacitor, whether alone or in series with a resistor could be switched without causing a "bump."

Again, I have disclosed my controller to be built around an inverted type of high-gain amplifier O. For the sake of structural simplicity this is convenient, and because secondary error voltage $e$ is obtained by summation, so to speak, it is necessary. However, a direct amplifier, that is, a high-gain amplifier, the output of which changes directly relative to changes in secondary error voltage $e$, could also be utilized.

For example, A 1:1 inverted amplifier could be provided to the input of which the feedback voltage at the junction of $R_3$ and $Z_L$ would be applied. The output of the amplifier would then have connected thereto $C_3$, $R_2$ and resistors 18 and 19. In essence, the problem is merely one of keeping the feedbacks to terminal A effectively degenerative under the envisaged conditions of operation. A 1:1 inverted amplifier, of course, is an amplifier of the same type as amplifier O but has a fixed gain of $-1$.

It is obvious, too, that means other than $bC_2$ and $(1-b)C_2$ could be utilized for changing the gain or proportional band of the controller. For example, by disconnecting $(1-b)C_2$ from circuit common and varying the value of $R_3$, the feedback resistor, with $bC_2$ fixed at some suitable value, the following transfer function would be obtained ($C_3$ omitted):

$$-\frac{E_0}{E_i}=\frac{1}{K}\frac{C_1}{bC_2}\left(1+\frac{1}{R_1C_1P}\right)(1+R_2bC_2P) \qquad (5)$$

The new quantity K is a feedback factor representing the portion of the voltage $E_0$ fed back to terminal A, and variation of which portion varies the gain of the controller. While the $bC_2$ and $(1-b)C_2$ gain control has the advantage of being bumplessly variable, insofar as overpeaking due to reset is concerned, use of the diode limiting circuit leads to the same results irrespective of which gain-adjusting expedient be chosen.

Again, as indicated by Equation (4), the circuit of FIG. 1 in its entirety permits gain adjustment by variation of $R_3$.

Finally, the diode limiting circuit is capable of many variations. It is known, for example, to provide limiting circuits utilizing separate biasing batteries, rather than a resistor network and source of negative potential H, or consisting of Zener diodes, which require no bias voltage. Furthermore, the limiting circuit is essentially a switching device that serves to short-circuit, in effect, the feedback network consisting of $bC_2$, etc., whereby the output of amplifier O is fully opposed to the input at terminal A. Since, in addition to diode switching, numerous varieties of electronic and mechanical switching schemes are old in the art, it is conceivable that means other than diodes could be provided to limit the voltage at terminal A with similar results, and the claims appended hereto should therefore be construed accordingly.

Figure 3:
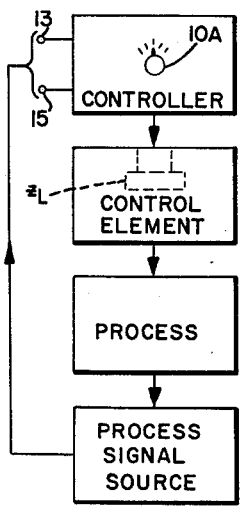
FIGURE 3 is a diagram of a process control system in which may be incorporated a controller according to the invention.

Thus far, the description has had mainly to do with circuitry of a controller according to the invention. FIGURE 3, however, illustrates a typical process control loop of the sort such as may profitably incorporate the controller of FIGURE 1 as a basic component. Thus, the box labeled CONTROLLER would incorporate a controller according to the invention, say, in the form illustrated in FIGURE 1. The next box labeled CONTROL ELEMENT, is illustrated as containing the load impedance $Z_L$, which makes the input to CONTROL ELEMENT the current $I_L$. Since CONTROL ELEMENT conventionally is a device such as a valve, rheostat, or the like, controlling some source of energy such as a heat exchange medium, fuel, electricity, and so on, it has an output of energy controlled in accordance with $I_L$. A third box, labeled PROCESS, receives this energy and typically is a furnace, or other environment containing some thing, material, etc., affected by the energy output of CONTROL ELEMENT. A fourth box, labeled PROCESS SIGNAL SOURCE represents a measuring device which abstracts energy of some sort from the process environment, material, or thing, which energy is in some way a measure of the effect of the control energy on or in PROCESS. PROCESS SIGNAL SOURCE thus closes the control loop by providing a signal at terminals 13 and 15 of CONTROLLER, which is shown as having a knob 10A representing a suitable device for adjusting tap 10, to establish some suitable value of set point signal S.

In a loop of this sort, the basic functional characteristic of the system is the tendency of the controller to drive the signal at terminals 13 and 15 to a value corresponding to the setting of knob 10A. Since the loop is closed, the control tendency of the controller is at least potentially evocable by a disturbance anywhere in the loop with oft-times adverse results. A controller having the novel gain control of FIGURE 2 obviates the possibility of disturbance as a result of gain adjustment and, with limiting, does not allow itself to be "wound up" by the demands of PROCESS.

In the foregoing, I have described my invention in the best form known to me in sufficient detail to enable those skilled in the art to easily make and use it. It is to be understood that various disclosed details of the invention may be varied and/or omitted without departing from the spirit of the invention, the essential aspects of which are embodied in the claims appended hereto, to which reference is to be had in determining the limits of protection I pray be granted me by U.S. Letters Patent.

I claim:

1. In combination, a feedback amplifier and a feedback gain control therefor; said amplifier having a voltage input and a signal output; said amplifier being constructed and arranged to produce an output signal, at said output, in response to an input voltage applied to said input; circuit means connected to said output, said circuit means being responsive to said output signal to develop a feedback voltage representative of said output signal, and which feedback voltage, if applied to said input, would establish substantially zero voltage at said input, there being a point of reference potential common to the said voltages and to which said voltages are referred; impedance means for connecting said input to an external source of signal, said impedance means being constructed and arranged to apply signal from said source, to said input, in the form of said input voltage; said gain control including a plurality of condensers, each of said condensers having one side conductively connected to said circuit means so as to have said feedback voltage applied continuously to said one side, first conductive means conductively connecting together the other sides of all of a part of said plurality of condensers so as to define a first capacitor having a capacitance equal to the sum of the capacitance values of the condensers of said part, second conductive means conductively connecting together the other sides of all of the remainder of said plurality of condensers so as to define a second capacitor having a capacitance equal in value to the sum of the capacitance values of the condensers of said remainder, the total number of said condensers in said remainder of said plurality being equal to the total number of condensers in said plurality, less the total number of condensers in said part of said plurality; said first conductive means being conductively connected to said point of reference potential, and said second conductive means being connected to said voltage input so as to have said input voltage applied thereto, and means operable at will for disconnecting a said other side of at least one of said plurality of condensers from one of said conductive means and connecting it to the other of said conductive means.

2. The invention of claim 1 wherein the last said means is operable at will for disconnecting a said other side of one of said plurality of condensers from that one of the said conductive means to which it is conductively connected and conductively connecting the last said other side to the other of said conductive means, and, substantially simultaneously, for disconnecting a said other side of another of said plurality of condensers from said other of said conductive means and conductively connecting the said other side of said another of said plurality of condensers to said one of the said conductive means.

3. The invention of claim 1, wherein the last said means includes structure mechanically connecting said conductive means together for simultaneous movement thereof while maintaining said conductive means electrically isolated one from the other, there being provided a series of spaced electrical contacts arranged in a closed path, and there being at least as many of said contacts in said series as there are condensers in said plurality; said first conductive means extending along and in conductive sliding contact with a portion of said series of contacts, the said other sides of said part of said plurality of condensers being conductively connected to contacts of said portion of said series of contacts, said second conductive means extending along and in conductive sliding contact with the rest of said series of contacts, the said other sides of said remainder of said plurality of said condensers being conductively connected to contacts of the said rest of said series of contacts; said portion of said series of contacts being a number of consecutive contacts and said rest of said series being a number of consecutive contacts; said conductive means being constructed and arranged to move along said path in sliding conductive contact with said contacts, whereby if said conductive means are moved along said path in sliding conductive contact with said contacts, contacts in sliding conductive contact with said first conductive means and contacts in sliding conductive contact with said second conductive means respectively come into sliding contact with said second conductive means and with said first conductive means.

4. The invention of claim 3 wherein the spacing between adjacent ends of said conductive means is large enough to prevent both said ends from being simultaneously in sliding conductive contact with the same contact.

5. In combination, a feedback amplifier and a feedback gain control therefor; said amplifier having a voltage input and a signal output; said amplifier being constructed and arranged to produce an output signal, at said output, in response to an input voltage applied to said input; circuit means connected to said output, said circuit means being responsive to said output signal to develop a feedback voltage representative of said output signal, and which feedback voltage, if applied to said input, would establish substantially zero voltage at said input, there being a point of reference potential common to the said voltages and to which said voltages are referred; impedance means for connecting said input to an external source of signal, said impedance means being constructed and arranged to apply signal from said source, to said input, in the form of said input voltage; said gain control including a plurality of condensers, said plurality of condensers being connected in parallel to said circuit means for receiving said feedback voltage therefrom and in parallel to one of said voltage input and said point of reference potential for applying said feedback voltage thereto; at least one further condenser being connected to said circuit means for receiving said feedback voltage therefrom and to the other of said voltage input and said point of reference potential for applying said feedback voltage thereto; and switching means for interchanging said one further condenser with one of said plurality of condensers.

6. The invention of claim 5 wherein said switching means is constructed and arranged so as to interchange condenser connections to said voltage input with condenser connections to said point of reference potential.

7. The invention of claim 5 wherein each condenser includes a contact by which it is electrically connectible to said voltage input, and said contacts are arranged in a closed series of contacts and spaced one from the other; a first electrically conducting slidable segment arranged along said series of contacts and constructed so as to be movable there along in electrical contact with a number of contacts equal in number to said plurality of condensers, a second electrically conducting slidable segment arranged along said series of contacts and constructed so as to be movable there along in electrical contact with at least the contact of the said further condenser; one said segment being connected to said voltage input and the other said segment being connected to said point of reference potential.

8. The invention of claim 7 wherein said segments are ganged for simultaneous motion in sliding contact with and along said series of contacts, said segments being spaced enough from each other along the series of contacts that no single contact is electrically contacted by both segments simultaneously.

9. In combination, a voltage amplifier having an output circuit providing an output electrical signal, said amplifier having a voltage input for applying input voltage thereto such as to cause said amplifier to produce said electrical signal at said output; an input circuit including an impedance connected to said input for providing said input voltage at said input; feedback means connected to said output circuit for deriving therefrom a feedback voltage representative of said electrical signal and such, that if applied to said input the voltage at said input will be substantially zero, whereby said feedback means determines the effective gain of said amplifier in part, at least; a feedback voltage divider including a first variable capacitance of value $bC$ wherein $C$ is a given quantity of capacitance and $b$ is a number not less than zero nor greater than 1, a second variable capacitance of value $(1-b)C$, adjusting means operable for simultaneous varying each capacitance over values corresponding to the range of $b$, said capacitances being connected together at one side of each and to said output circuit such as to receive said feedback voltage at such one sides, the other side of one of said capacitances being connected to a point of reference potential common to said input voltage and said feedback voltage, and the other side of the other of said capacitances being connected to said voltage input, whereby operation of said adjusting means constitutes gain control means for said amplifier.

10. In combination, an amplifier having an input terminal and an output terminal, and so constructed and arranged as to produce an electrical output signal at said output terminal in response to an electrical input voltage applied to said input terminal, feedback input impedance means connected to said input terminal for applying said electrical input voltage thereto, means including first capacitance having one side arranged to be charged in effect by said output signal and having its other side connected to said input terminal, whereby the gain of said amplifier is modified by said feedback means in correspondence with the value of said first capacitance, impedance means including second capacitance having one side arranged to be charged in effect by said output signal, and having its other side arranged to be charged to the potential of a point of potential substantially equal to the potential of said input terminal, said second capacitance being constructed and arranged to have its other side disconnected from the said point of potential and connected instead to said input terminal.

11. The invention of claim 10 wherein said feedback means and said amplifier are constructed and arranged so that feedback to said input terminal maintains said input voltage at substantially zero magnitude relative to a point of common potential to which are referred said input voltage and such voltage as arises from charging said capacitances, and the first said point of potential is identical with said point of common potential.

12. In combination, a high-gain relay device having an output terminal and and input terminal, said relay device being responsive to a relatively small signal applied to said input terminal to produce a relatively large signal at said output terminal; input means connected to said input terminal, said input means being responsive to an error signal applied thereto to produce a signal at said input terminal; output circuitry connected to said output terminal to receive the signal produced at said output terminal; feedback means connected between said output circuitry and said input terminal for deriving a feedback signal representative of said signal produced at said output terminal; said input means and said feedback means each including impedance such that the transfer function relating the magnitude of output signal to the magnitude of a said error signal applied to said input means includes a term $$G\left(1+\frac{1}{T_1 P}\right)$$

where P is the Laplace operator. $T_1$ is a time constant determined by the elements of said input means G is the effective gain of said output signal relative to said input signal and is determined by the elements of both said input means and said feedback means, the arrangement being that for zero error signal, substantially zero signal exists at said input terminal, whereby a given range of output signal can be produced either by a corresponding range of error signal, or by the existence of a non-zero error signal for a given length of time, without said signal at said input terminal departing substantially from zero value; limiting means for preventing said signal at said input terminal from departing substantially from zero value, said limiting means being responsive to said output signal to produce a limiting signal opposed in sense to said signal at said input terminal; said limiting means being constructed and arranged so that said limiting signal is equal in magnitude to a change in the said signal at said input terminal such as would cause said output signal to change from one limit of said range of output signal to a value outside said range and cause said limiting signal to be produced, and said limiting means being arranged to apply said limiting signal to said output terminal; whereby, if said error signal assume a value or last long enough at a value not zero, such that said output signal tends to pass out of said given range, said limiting signal will maintain said signal at said input terminal at values such that said output signal does not pass outside of said given range.

13. The invention of claim 12, including a control element arranged to control element arranged to control a variable in a process, said control element being connected to said output circuitry for control of said variable in response to said output signal, means responsive to said variable to produce a process signal the magnitude of which is proportional to said variable, means for producing a reference signal proportional to the value at which it is desired to maintain said variable, means for opposing said process signal and said reference signal so as to produce a deviation signal proportion to the deviation of the actual value of said process signal from said value at which it is desired to maintain said variable, said deviation being applied to said input as the aforesaid error signal, and said control element being arranged to exert its control effect on said process in such a way as to oppose deviation of said variable from the said value at which it is desired to maintain said variable.

14. A controller comprising a high-gain voltage amplifier adapted to produce at its output a control signal, primary error voltage producing means for producing primary error voltage, resistance means and capacitance means, said resistance means and said capacitance means being connected in parallel between the input of said amplifier means and said primary error voltage for producing a secondary error voltage at said input, from said primary error voltage; capacitance means connected between input and output of said amplifier, said capacitance means being effectively responsive to said output signal to derive an inverse feedback voltage therefrom and to apply said feedback voltage to said input, whereby said secondary error voltage tends to remain relatively small compared to said primary error voltage and said control signal is inversely proportional to the magnitude and duration of said primary error voltage; and limiting means responsive to a deviation of the magnitude of said control signal from a predetermined range of values for producing a limiting voltage having a magnitude equal to the change in magnitude of secondary error voltage needed to cause the magnitude of said control signal to change in an amount equal to the excess of said deviation over a limit of said range of values, said limiting means being connected to said input so as to oppose said limiting voltage to said secondary error voltage.

15. In combination, a high-gain, high input impedance D.C. amplifier having an input terminal, to which an input voltage to be amplified is to be applied, and an output terminal at which an output voltage appears in response to such input voltage; a resistor and a first capacitor connected in parallel and to said input terminal; means for providing a negative feedback voltage proportional to the current through a load impedance connected to said output terminal; a second capacitor connected between the last said means and said input terminal for applying said feedback voltage to said input terminal, the arrangement being that the voltage at said input terminal tends to assume a nearly-zero value; limiting means for preventing said voltage at said input terminal from substantially departing from nearly-zero value, said limiting means including means responsive to said current for producing a limiting voltage opposed in sense to said voltage at said input terminal should said current exceed a given swing corresponding to a given range of nearly-zero voltage at said input terminal, said means for producing said limiting voltage being constructed and arranged so that said limiting voltage would be substantially equal to the amount by which said voltage at said input terminal would depart from its said given range to cause said current to exceed said given swing; and means for applying said limiting voltage to said input terminal; whereby said voltage at said input terminal would not depart from said given range of nearly-zero value, nor would said current exceed said given swing, even were a voltage applied via said resistance and said first capacitor to said input terminal, and were of such nature as to cause said voltage at said input terminal to depart from its given range in the absence of said limiting means.

16. The invention of claim 15 wherein said resistance can be adjusted in value and including a third capacitor, arranged to apply said feedback voltage to a point of reference potential common to all the said voltages, each of said second and third capacitors being constructed and arranged to be adjustable over ranges of capacitance values such that the ratio of their individual capacities can be varied while the sum thereof remains constant; whereby the said current contains an integral component that can be adjusted by adjusting the value of said resistance and a proportional component that can be adjusted by varying the said ratio, and a change in neither of such adjustments affects the other adjustment.

17. The invention of claim 14, including a control element responsive to said control signal to cause said primary error voltage to change in a sense opposing deviation of said secondary error voltage from zero.

18. In a process control system having a control element for applying control effect to a process in accordance with the magnitude of a control signal applied to said control element, a primary error voltage representative of the desired and actual value of a variable in said process of the type affected by said control effect, a high gain D.C. voltage amplifier having input, feedback and output circuitry, and an input and an output, said input circuitry connecting said error voltage to said input, said output being connected to said output circuitry, and said feedback circuitry connecting said input terminal and said output circuitry; said input and feedback circuitry being of the type such that said error voltage causes said amplifier to produce a control signal in said output circuitry and is related to said control signal as $$G\left(1+\frac{1}{T_1 P}\right)$$

wherein G is the ratio of input capacitance to feedback capacitance, and $T_1$ is the product of input capacitance and input resistance, the improvement comprising limiting means connected between said output circuitry and said input circuitry, said limiting means being connected to said amplifier between said output circuitry, and said input, and in parallel to said feedback circuitry; said limiting means being of the type normally substantially preventing current flow between its points of connection to said output circuitry and to said input, said limiting means also being responsive to said control signal, when said control signal has a magnitude outside of a given range of magnitude, to substantially short-circuit said feedback circuitry and substantially nullify the voltage at said input due to said error voltage.

References Cited in the file of this patent
UNITED STATES PATENTS

| | | |
|---|---|---|
| 1,251,440 | Sultzer | Dec. 25, 1917 |
| 1,491,341 | Eaves | Apr. 22, 1924 |
| 1,866,456 | Fichandler | July 5, 1932 |
| 1,992,433 | Klotz | Feb. 26, 1935 |
| 2,255,805 | Vance | Sept. 16, 1941 |
| 2,506,365 | Knight | May 2, 1950 |
| 2,603,723 | Thompson | July 15, 1952 |
| 2,658,957 | Usselman | Nov. 10, 1953 |
| 2,697,908 | Offner | Dec. 28, 1954 |
| 2,730,577 | Winters | Jan. 10, 1956 |
| 2,762,938 | Newbold | Sept. 11, 1956 |
| 2,857,104 | Gilbert | Oct. 21, 1958 |
| 2,901,563 | McAdam | Aug. 25, 1959 |
| 2,903,633 | Cother | Sept. 8, 1959 |
| 2,904,642 | Quinlan | Sept. 15, 1959 |

OTHER REFERENCES

Whiteley article on pages 353–367 of the Journal of the Institution of Electrical Engineers, volume 93, part II, 1946.